United States Patent [19]

Bouteille

[11] 4,214,607

[45] Jul. 29, 1980

[54] UNIDIRECTIONAL FLOW LIMITER

[75] Inventor: Daniel Bouteille, Marnes-la-Coquette, France

[73] Assignee: Societe Anonyme: La Telemecanique Electrique, France

[21] Appl. No.: 2,604

[22] Filed: Jan. 11, 1979

Related U.S. Application Data

[62] Division of Ser. No. 774,311, Mar. 3, 1977, Pat. No. 4,171,007.

[30] Foreign Application Priority Data

Mar. 5, 1976 [FR] France ............................. 76 06384
Mar. 5, 1976 [FR] France ............................. 76 06385

[51] Int. Cl.$^2$ ................... F16K 11/10; F16K 15/14
[52] U.S. Cl. ............................. 137/499; 137/512.15; 137/513.7; 137/860
[58] Field of Search ............ 137/322, 494, 499, 512, 137/512.15, 513.7, 556, 860

[56] References Cited

U.S. PATENT DOCUMENTS

| | | | |
|---|---|---|---|
| 2,922,432 | 1/1960 | Hontington et al. | 137/513.7 X |
| 3,285,274 | 11/1966 | Bouvier | 137/322 |
| 3,289,694 | 12/1966 | Frye | 137/513.7 X |
| 3,395,725 | 8/1968 | Roach | 137/512.15 |
| 3,441,249 | 4/1969 | Aslan | 137/556 X |
| 3,448,766 | 6/1969 | Schule | 137/512.15 X |
| 3,451,422 | 6/1969 | Chorkey | 137/512 X |
| 3,459,217 | 8/1969 | Callahan | 137/512.15 X |
| 3,493,270 | 2/1970 | Doerfler | 137/494 |
| 3,857,405 | 12/1974 | Heideman | 137/860 X |

Primary Examiner—William R. Cline
Attorney, Agent, or Firm—Staas & Halsey

[57] ABSTRACT

Unidirectional flow limiter housed in a union between a pipe and a user apparatus, comprising a first channel, a second channel, a flow reduction member between the two channels, a third channel, a non-return valve in the third channel and constituted by a deformable annular member placed concentrically about one of the first or second channels.

18 Claims, 6 Drawing Figures

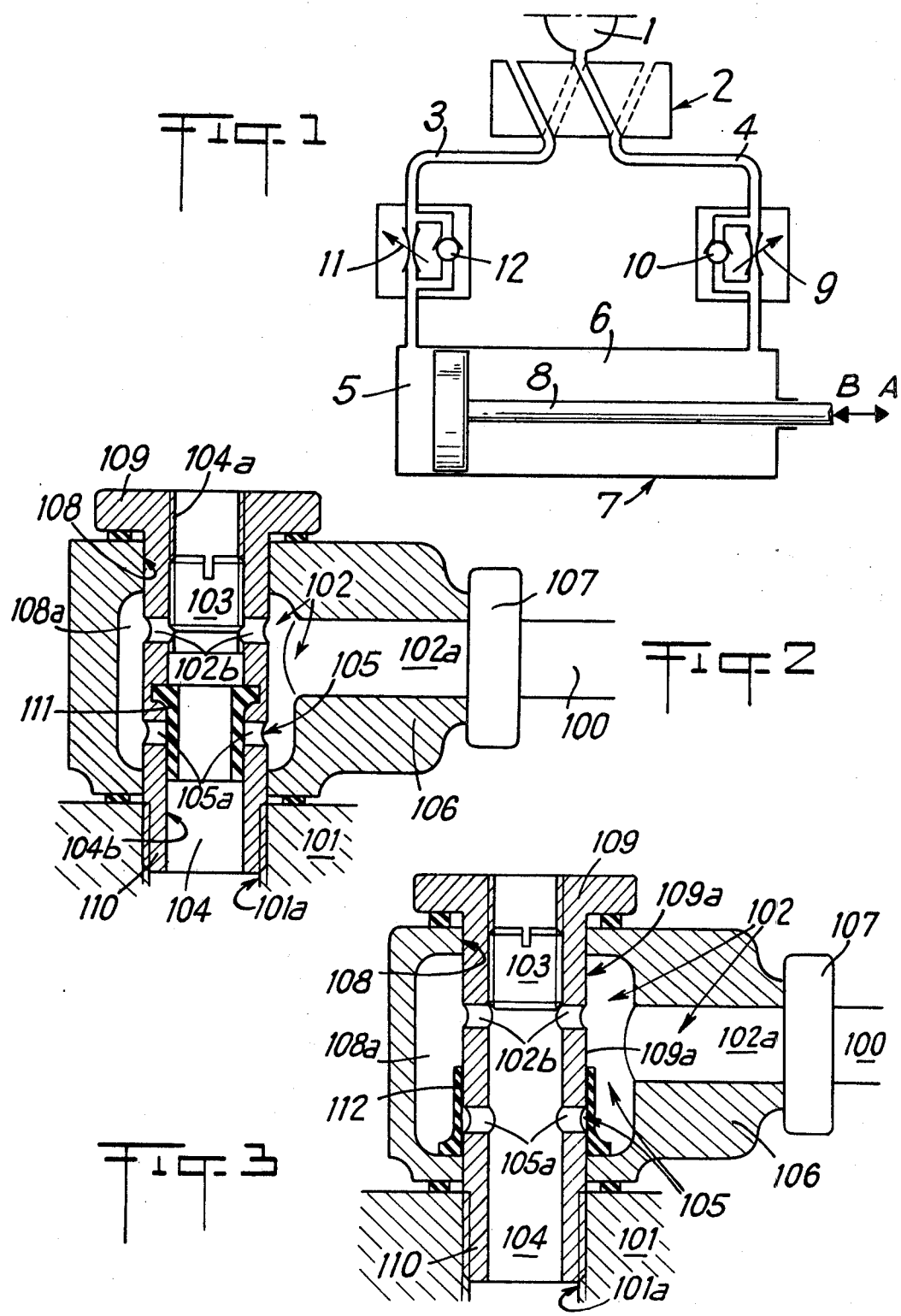

UNIDIRECTIONAL FLOW LIMITER

This a division of application Ser. No. 774,311 filed Mar. 3, 1977, now U.S. Pat. No. 4,171,007.

BACKGROUND OF THE INVENTION

The present invention relates to a unidirectional flow limiter.

SUMMARY OF THE PRIOR ART

The problem for which the invention intends to provide a practical solution is that of regulating the speed of a pneumatic receiver such as a double-acting ram, the theoretical solution of which is given by the diagram of accompanying FIG. 1. This figure shows a source of pressurised fluid 1 adapted to be placed in selective communication, via a four-way and two position distributor 2, with a pipe 3 and a pipe 4 for supplying chambers 5 and 6 respectively of a double-acting ram 7. In order to regulate the velocity of the piston 8 of this ram in either of directions A or B of displacement of said ram, it is known to act on the exhaust of the suitable chamber. Thus, in direction A, the velocity parallel in pipe 4 at the inlet and outlet of a non-return valve 10. Similarly, to regulate the velocity of piston 8 in direction B, a flow limiter 11 disposed in parallel in the pipe 3 at the inlet and outlet of a non-return valve 12 will be actuated. These devices 9, 10, 11, and 12 allow a free passage of the pressurized fluid issuing from the source 1, in the direction of one of chambers 5 or 6, whilst simultaneously limiting the exhaust flow of the other chamber.

Devices assuring these two functions are known. They are inserted in pipe 3 and 4 between the distributor 2 and the ram. One of the drawbacks of these known devices resides on the one hand in the fact that they are bulky and on the other hand in the fact that, for a simple installation as shown diagrammatically in FIG. 1, they require the use of four supplementary connecting members. Now, the present tendency in the domain of pneumatic equipment is to produce more and more compact assemblies. These devices have therefore become prohibitive.

Devices assuring the above-mentioned functions are also known, housed in elbow joints. These devices also have their drawbacks, one being that they can be disposed only on the receiver member, i.e. the ram 7. In addition, they are much more bulky than the normal union replaced. Furthermore, their design is such that the section of passage of the gaseous fluid is much reduced with respect to the nominal internal section of the pipe to which it is applied. This results in a considerable limitation of the velocity of the ram obtained with respect to the velocity which could be obtained. Finally, the manufacture of such devices is complicated as it requires fine, long and close borings and the production of a non-return valve with ball and valve seat.

It is an object of the invention to remedy the above-mentioned drawbacks and to propose a novel device whose design enables it to be used as union, either at the outlet of the distributor or at the inlet of the ram, and which, contrary to the other known devices, presents a maximum section of passage substantially equivalent to the nominal internal section of the pipes of the installation, a bulk equivalent to that of the replaced union, a simple mass production, at a low cost price and finally the possibility of being used as union at the distributor, the utility of which is undeniable when the velocity of the ram must be regulated whilst it is impossible to reach said ram.

SUMMARY OF THE INVENTION

To this end, the invention relates to a unidirectional flow limiter disposed between a fluid pipe and a user apparatus, comprising a first channel disposed between said pipe and an adjustable flow reducing member, a second channel disposed between the flow reducer and the user apparatus and a third channel connecting the said two channels and comprising a non-return valve, said limiter being constituted, in a connecting piece, by a first cylindrical element comprising means for its connection to said pipe and a bore, a first part of the first channel extending between these means and this bore and by a second cylindrical element housed in said bore, provided with means for its fixation to the user apparatus and with the said flow reducing member, said second channel extending between said reducing member and said fixing means.

According to a feature of the invention:

(1) the second channel is constituted by a bore of large section made substantially in the axis of the second element, (2) the first channel comprises a second part constituted by a radial opening made in the wall of said second element and terminating in the second channel at the flow reducing member, (3) the third channel opens into the second channel between the reducing member and the user apparatus, and (4) said valve is constituted by a deformable annular member placed concentrically around one of the first or second channels and transversely with respect to the third channel so as to form a unidirectional obturator for said third channel by elastic abutment on at least one surface of revolution through which said third channel passes substantially radially.

In a first embodiment of the device according to the invention, the said third channel is constituted by part of an annular chamber made in the first element around the second, connected to the first channel and by a series of orifices made radially in the second element and connecting said chamber to said second channel.

In a first variant of this embodiment, the said annular member is placed in elastic abutment around the second element in the said annular chamber opposite the said series of orifices.

In a second variant of this embodiment, the said annular member is placed opposite the said series of orifices, in elastic abutment inside said second channel.

In a second embodiment of the device according to the invention, the third channel is constituted by an annular chamber made in the first element around the first channel, connected to said second channel and communicating with said first channel by means of a series of orifices provided radially in a wall separating said chamber and said first channel.

According to a first variant of this second embodiment, the said annular member is placed, oppositie said orifices, in elastic abutment inside said first channel.

According to a second variant, the said annular member is placed, in said chamber, in elastic abutment on the outer face of a wall separating said chamber from said first channel, in which said orifices are made, and opposite said orifices.

Said chamber is preferably delimited in a housing of the first element by a stopper provided with a part of the first channel and means for connection to said pipe, constituting the wall separating the chamber and the first channel.

In all these embodiments, the said annular member is either constituted by a ring made of elastic material which is higher than it is thick, a cylindrical surface of which obturates a series of orifices belonging to the third channel, or constituted by an O-ring made of elastic material applied on two substantially conical surfaces so as to obturate a series of orifices belonging to the third channel and opening out between said surfaces.

BRIEF DESCRIPTION OF THE DRAWINGS

FIG. 1 is a schematic diagram illustrating delivery of fluid to a pneumatic receiver.

FIGS. 2, 3, 4 and 5 schematically show four variant embodiments of the device according to the invention.

DESCRIPTION OF THE PREFERRED EMBODIMENTS

Figure 4:
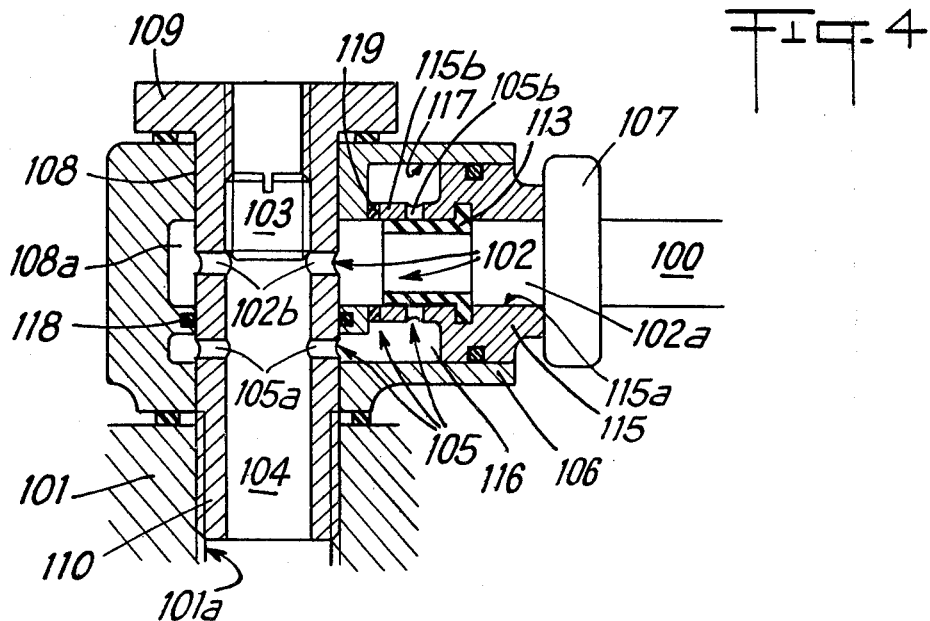

Referring now to the drawings, FIGS. 2 to 5 show a flow limiter according to the invention, disposed between a fluid pipe 100 and a user apparatus 101. This limiter comprises a first channel 102 disposed between the conduit 100 and a flow reducing member 103, a second channel 104 disposed between the reducing member 103 and the user apparatus 101, and a third channel 105 connecting the two channels 102 and 104 in shunt with respect to the flow reducing member 103. This channel 105 comprises a non-return valve which will be described in greater detail hereinafter.

This limiter is constituted, in an elbow joint, by a first element 106 comprising means 107 for its connection to pipe 101 and a bore 108 provided in the present case with a recess 108a, a first part 102a of the channel 102 extending between the means 107 and the bore 108. It also comprises a second cylindrical element 109 housed in the bore 108 and equipped with means 110 for being fixed to the user apparatus, for example, by screwing into the threaded orifice 101a of said latter. This second element 109 carries the flow reducing member 103. The second channel is in fact constituted, in the element 109, by a bore of large section made substantially in the axis of the element 109.

The said first channel comprises a second part constituted in the present case by a series of radial orifices 102b made in the wall of the element 109. This series may be replaced by a single radial opening (not shown). The orifices 102b terminate in the second channel 104 at the flow reducing member 103. It should be noted that this member 103 is constituted in the present case by a screw cooperating with a threaded part 104a of a bore with which the element 109 is provided in its upper part, which, depending on its degree of penetration, uncovers more or less the orifices 102b so as to constitute a variable constriction.

The third channel 105 opens out into the second channel 104 between the reducer 103 and the user apparatus 101 through another series of orifices 105a or a single radial opening (not shown).

The non-return valve is constituted by a deformable annular member 111, 112, 113, 114 placed concentrically around the first channel 102 or second channel 104 and transversely with respect to the third channel 105, so as to form a unidirectional obturator for said channel 105 by elastic abutment on at least one surface of revolution 104a, 109a, 115a, 115b through which said third channel passes substantially radially.

With reference to FIGS. 2 and 3, it will be noted that the said third channel is constituted by part of the recess 108a comprised in the bore 108 which determines an annular chamber surrounding the second element 109 in which the first channel 102 opens and by a series of radial orifices 105a made radially in the second element 109 placing said chamber in communication with the second channel 104. FIG. 2 shows that the non-return valve is constituted by an annular member 111 placed in elastic abutment on the inner cylindrical surface 104b of the second element 109 determining the second channel 104, opposite the series of radial orifices 105a belonging to the third channel. In this way, a circulation of fluid from pipe 100 towards the apparatus 101 is made freely from the first to the second channel via the recess 108a and the orifices 105a, by lifting the annular member 111, whilst a reverse circulation from the apparatus 101 towards pipe 100 is made imperatively from the second channel 104 to the first channel 102 through the orifice 102b more or less obturated by the member 103, thus of limited flow. In fact, in this latter direction of circulation, the elastic member 111 is pressed against the orifices 105a and obturates the third channel 105.

FIG. 3 shows that the non-return valve is constituted by an annular member 112 placed in elastic abutment on the outer cylindrical surface 109a of the second element 109, internally defining the annular chamber 108a, opposite the series of radial orifices 105a belonging to the third channel 105. In this way, the fluid circulating from pipe 100 towards apparatus 101 is obliged to pass from the first channel into the second channel through the orifices 102b partially obturated by the reducer member 103, therefore to circulate with a limited flow. On the other hand, in the reverse direction of circulation, from apparatus 101 towards pipe 100, the fluid passes freely from channel 104 to channel 102 through the third channel 105, by lifting the annular member 112 on leaving the orifices 105a.

Figure 5:
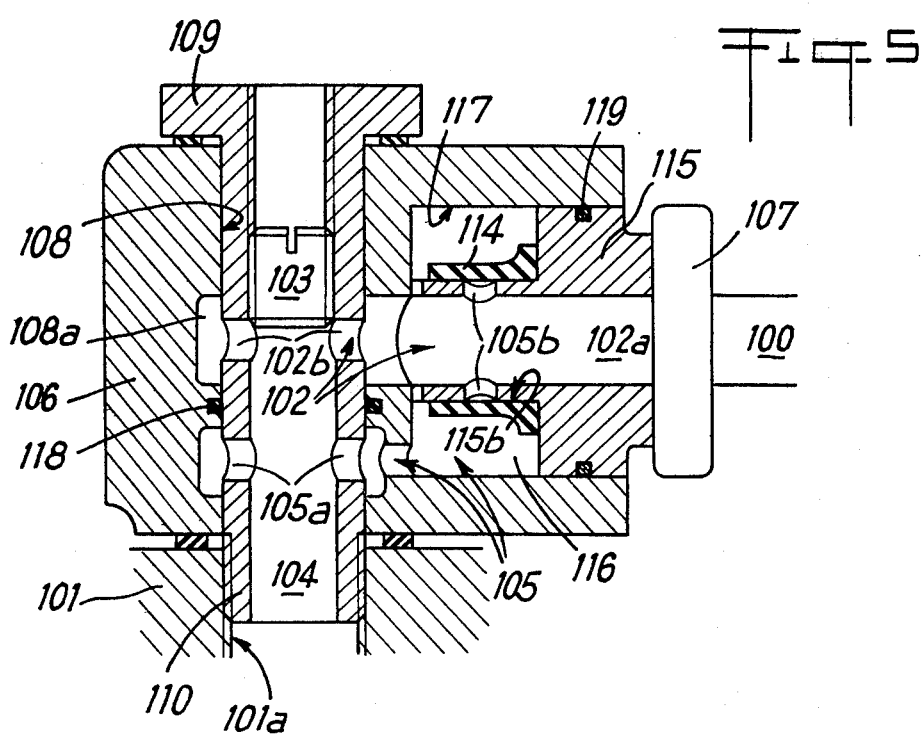

FIGS. 4 and 5 show that the said third channel 105 is constituted by an annular chamber 116 made in the first element 106 around the first channel 102 or, more precisely, around its first part 102a, through a series of orifices 105b made radially in the wall 115b separating the chamber 116 from said first channel and through the series of orifices 105a connecting said chamber to the second channel 104. It will be noted that, in these Figures, said series 105a may be replaced by any radial opening made in the second element 109. Said chamber 116 is in fact made between a housing 117 provided in the first element 106 and a stopper 115, mounted in tight manner in said housing, provided with the part 102a of the first channel 102 whose end part constitutes said wall 115b. The tightness between the channels 102, 104 and 105 is ensured by O-rings referenced at 118 and 119.

In FIG. 4, the annular member 113 is placed opposite the orifices 105b in elastic abutment inside the first channel 102 on the cylindrical surface 115a. In this way, the fluid circulating from pipe 100 to apparatus 101 presses the deformable member 113 against the orifices 105b and obturates them and is obliged to pass through the orifices 102b which are partially obturated in adjustable manner by member 103. This circulation is therefore effected in this direction with a limited flow.

On the other hand, in the other direction, i.e. for a circulation of fluid issuing from apparatus 101 towards pipe 100, the fluid preferably passes at normal flow through orifices 105a, the chamber 116 and orifices 105b, by lifting the deformable member 113.

FIG. 5 shows that the non-return valve is constituted by an annular member 114 placed around the stopper 115, in elastic abutment on the outer cylindrical surface 115b of this stopper, opposite orifices 105b. In this way, when fluid flows from pipe 100 into apparatus 101, the fluid finds a passage at normal flow by lifting the member 114 and rejoining the second channel 104 via orifices 105b, the chamber 116 and the orifices 105a. On the other hand, in the opposite direction, the fluid presses the member 114 against the surface 115b and is therefore obliged to join the pipe 100 through orifices 102b partially obturated by the member 103. Circulation is then with a limited flow.

It will be noted that the deformable members 111, 112, 113, 114 of FIGS. 2 to 5 are annular elements made of plastics material, which are higher than they are thick in order to have the suppleness required for good functioning, and which are in abutment on a cylindrical surface at whose level radial orifices open out.

Figure 6:
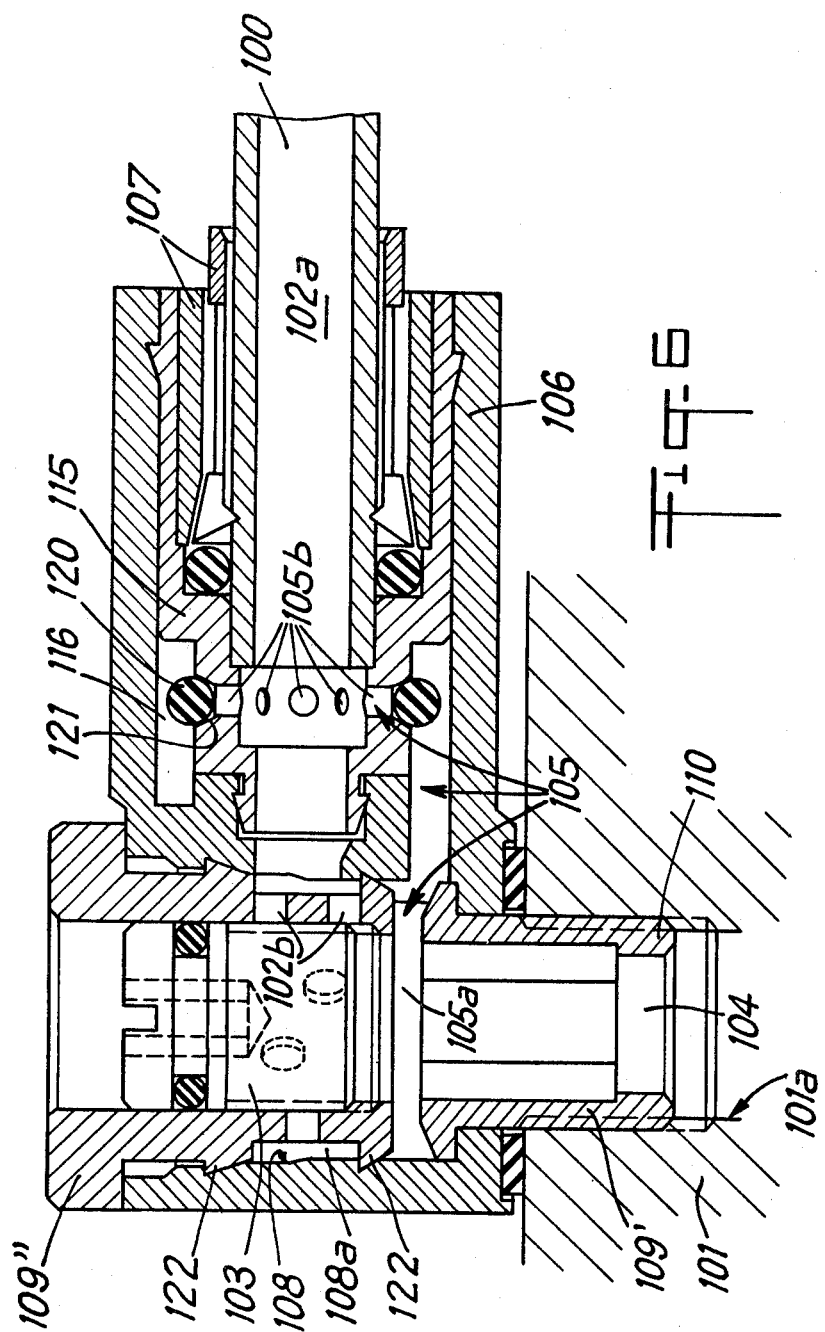
FIG. 6 illustrates an embodiment of the variant according to FIG. 5.

FIG. 6 illustrates a variant embodiment of a device according to the invention of the type such as shown in FIG. 5. This Figure shows certain elements which have already been described with reference to the preceding Figures, and which bear the same references. However, it will be noted that the second element is constituted, in this case, of two parts 109' and 109" housed in the bore 108 of the first element 106, the part 109' bearing the means 110 for its fixation to the user apparatus 101 and part 109" bearing the flow reducing member 103. The channel 105 opens out into channel 104 in the space of the bore 108 left free between the two parts 109' and 109", via a side opening 105a. The non-return valve is here constituted by an O-ring 120 made of elastic material applied to two surfaces of revolution 121 (here conical) made on the stopper 115 and between which the radial orifices 105b open out. The ring 120 is lifted by the fluid coming from channel 102 and leaving orifices 105b and flows at normal rate through channel 105 into channel 104. This ring is pressed on the surfaces 121 when the fluid circulates in the other direction and flows with a limited flow through orifices 102b.

Finally, it will be noted that the relative seal between the different channels is ensured, in FIG. 6, at the very moment of assembly, using an anchoring technique by circular cramps 122.

The advantages of the device according to the invention as described hereinabove with reference to the Figures, lie in the simplicity of the flow limiter and non-return valve functions which it carriers out. To be noted in particular is the simple assembly of the elastic obturator which is held in place by its own elasticity, without resorting to auxiliary fixing means.

More generally, the design of the device according to the invention enables it to be manufactured simply in metal, either by die-stamping or casting, or in plastics material by moulding, leading to unidirectional flow reducers whose bulk is no greater than those of the union used heretofore. It will be noted that, in addition to the assembly which operates in the same manner as the assembly of a conventional union, this device according to the invention offers possibilities of adjustment which are also similar to the possibilities of adjustment offered by known devices such as damping screws or conventional flow limiters. These arrangements are advantageous since they fit into the consumers'habits. Finally, the invention may be used on installations where the exhaust is collected, which presently tend to take precedence over installations with free exhaust.

The invention finds advantageous application in the field of construction of pneumatic equipment.

What is claimed is:

1. A connection element for connection between a fluid pipe and a user apparatus, comprising:

first means for defining a substantially cylindrical first elongated cavity, said first means including means for connecting said first cavity to said pipe to define a flow path between said first cavity and said pipe;

second means for defining an annular chamber around said first cavity, said annular chamber being separated from said first cavity by a substantially cylindrical wall having at least one opening therein to define at least one flow path between said first cavity and said annular chamber;

third means mounted within said first means adjacent to said annular chamber and passing through said first cavity for defining a substantially cylindrical second cavity, the axis of said second cavity intersecting the axis of said first cavity at substantially right angles, said third means being exposed to said first cavity and providing at least one flow path between said first and second cavities, said third means additionally being exposed to said annular chamber and providing at least one flow path between said second cavity and said annular chamber, said third means additionally including means for connecting said second cavity to said user apparatus to define a flow path between said second cavity and said user apparatus;

fourth means mounted within said second cavity for at least partially closing said at least one flow path between said first and second cavities, said fourth means comprising a substantially cylindrical member having substantially the same radius as said second cavity; and deformable annular means mounted on said substantially cylindrical wall and covering said at least one opening therein for permitting fluid flow in one direction only along said at least one flow path between said first cavity and said annular chamber.

2. The connection element of claim 1, wherein said third means comprises an elongated element having a cylindrical cavity therein said element having at least one opening to define at least one flow path between said first and second cavities, said element additionally having at least one opening to define at least one flow path between said second cavity and said annular chamber, and wherein said cylindrical member is adjustably mounted within said element for movement along the axis of said second cavity.

3. The connection element of claim 2, wherein said deformable annular means comprises a deformable annular member mounted within said first cavity.

4. The connection element of claim 2, wherein said deformable annular means comprises a deformable annular member mounted within said annular chamber.

5. The connection element of claim 1, wherein said third means comprises a first elongated element having a cylindrical cavity therein, said first element having at least one opening therein to define at least one flow path between said first and second cavities, and a second elongated element having a cylindrical cavity therein, said second element being coaxial with said first element and being mounted spaced apart from said first element, said at least one flow path between said second cavity and said annular chamber extending between said first and second elements, wherein said means for connecting said second cavity to said user apparatus is provided by said second element, and wherein said cylindrical member is adjustably mounted within said first element for movement along the axis of said second cavity.

6. The connection element of claim 5, wherein said deformable annular means comprises an O-ring mounted within said annular chamber.

7. A connection element for connection between a fluid pipe and a user apparatus, comprising:

a first element having a first elongated cavity therein, said first cavity having an axis and being divided by a plane perpendicular to said axis into first and second portions, said first portion having larger internal dimensions than said second portion as measured parallel to said plane, said first element further having a bore extending through said first element and through said second portion of said first cavity, said bore having an axis substantially perpendicular to the axis of said first cavity, said first element further having a second cavity extending from said bore to said first portion of said first cavity;

stopper means mounted in said first portion of said first cavity for dividing said first portion of said first cavity into a third elongated cavity having an axis, said third cavity being substantially coaxial with said first cavity and communicating with said second portion of said first cavity, and an annular chamber into which said second cavity opens, said annular chamber being disposed around said third cavity and being separated from said third cavity and from said second portion of said first cavity by a tubular wall having at least one opening therein to define at least one flow path between said third cavity and said annular chamber, said stopper means additionally including means for connecting said fluid pipe to said third cavity to define a flow path between said fluid pipe and said third cavity;

means mounted within the bore of said first element for defining a fourth cavity communicating with said annular chamber through said second cavity, said means including a tubular hollow element housed within said bore and extending at least through said second portion of said first cavity, said tubular hollow element being exposed to said second portion of said first cavity and having at least one opening therein to define a flow path between said fourth cavity and said second portion of said first cavity, said means additionally including means for connecting said fourth cavity to said user apparatus to define a flow path between said fourth cavity and said user apparatus;

means mounted in said tubular hollow element for at least partially obscuring said at least one opening therein to at least partially close said at least one flow path between said fourth cavity and said second portion of said first cavity; and deformable annular means mounted on said stopper means and covering said at least one opening in said tubular wall for permitting fluid flow in one direction only along said at least one flow path between said annular chamber and said third cavity.

8. The connection element of claim 7, wherein said means mounted within the bore of said first element comprises a tubular hollow element housed within said bore and extending through said first element, said tubular hollow element being exposed to said second portion of said first cavity and having at least one opening therein to define at least one flow path between said fourth cavity and said second portion of said first cavity, said tubular hollow element additionally being exposed to said second cavity and having at least one opening therein to define at least one flow path between said fourth cavity and second cavity.

9. The connection element of claim 8, wherein said deformable annular means comprising a deformable annular member mounted within said third cavity.

10. The connection element of claim 8, wherein said deformable annular means comprises a deformable annular member mounted within said annular chamber.

11. The connection element of claim 7, wherein said means mounted within said means mounted within the bore of said first element further comprises a second hollow tubular element housed within said bore and spaced apart from said hollow tubular element exposed to said second portion of said first cavity, said second cavity opening into said fourth cavity through the space between said hollow tubular elements, and wherein said means for connecting said fourth cavity to said user apparatus is provided by said second hollow tubular element.

12. The connection element of claim 11, wherein said deformable annular means comprises an O-ring mounted in said annular chamber and covering said at least one opening in said tubular wall.

13. A condition element for connection between a fluid pipe and a user apparatus, comprising:

a first elongated element having an axis and a first cavity therein said first cavity having a first substantially cylindrical portion substantially coaxial with the axis of said first cavity, and a second substantially cylindrical portion substantially coaxial with the axis of said first cavity, the radius of said first portion being greater than the radius of said second portion, said first element additionally having a substantially cylindrical bore extending through said first element and through said second portion of said first cavity, said bore having an axis substantially perpendicualr to the axis of said first cavity and a radius smaller than the length of said second cylindrical portion of said first cavity, said first element additionally having a second elongated cavity extending from said first portion of said first cavity through said bore, the axis of said second cavity being substantially parallel to the axis of said first cavity;

stopper means mounted in said first portion of said first cavity for defining a third substantially cylindrical cavity within said first portion of said first cavity and communicating with said second portion of said first cavity, said third cavity being substantially coaxial with said first cavity and having substantially the same radius as said second portion of said first cavity, and an annular chamber around said third cavity, said annular chamber being isolated from said third cavity and from said second portion of said first cavity by a substantially cylindrical wall having at least one opening therein to define at least one flow path between said third cavity and said annular chamber, said second cavity opening into said annular chamber, said stopper means additionally including means for connecting said fluid pipe to said third cavity for defining a flow path between said fluid pipe and said third cavity;

means mounted within the bore of said first element for defining a fourth cavity communicating with said annular chamber through said second cavity, said means including first elongated member having a substantially cylindrical tunnel substantially coaxial with said bore, said first member being housed within said bore and extending at least through said second portion of said first cavity, said fourth cavity extending into the tunnel of said first elongated member, said first elongated member being exposed to said second portion of said first cavity and having at least one opening therein to define a flow path between said fourth cavity and said second portion of said first cavity, said means mounted within the bore of said first element additionally including means for connecting said fourth cavity to said user apparatus to define a flow path between said fourth cavity and said user apparatus;

means adjustably mounted in said tunnel in said first elongated member for at least partially obscuring said at least one opening therein to at least partially close said at least one flow path between said fourth cavity and said second portion of said first cavity, said means comprising a substantially cylindrical member having substantially the same radius as said tunnel; and deformable annular means mounted on said stopper means and covering said at least one opening in said substantially cylindrical wall for permitting fluid flow in one direction only along said at least one flow path between said annular chamber and said third cavity.

14. The connection element of claim 13, wherein said means mounted within the bore of said first element comprises a first elongated member having a substantially cylindrical tunnel coaxial with said bore, said first member being housed within said bore and extending through said first element, said first member being exposed to said second portion of said first cavity and having at least one opening therein to define at least one flow path between said fourth cavity and said second portion of said first cavity, said first member additionally being exposed to said second cavity and having at least one opening therein to define at least one flow path between said fourth cavity and said second cavity.

15. The connection element of claim 14, wherein said deformable annular means comprises a deformable annular member mounted within said third cavity.

16. The connection element of claim 14, wherein said deformable annular means comprises a deformable annular member mounted within said annular chamber.

17. The connection element of claim 13, wherein said means mounted within the bore of said first element further comprises a second elongated member having a substantially cylindrical tunnel substantially coaxial with said bore, said second member being housed within said bore and spaced apart from said first member, said second cavity opening into said fourth cavity through the space between said first and second members, and wherein said means for connecting said fourth cavity to said user apparatus is provided by said second member.

18. The connection element of claim 17, wherein said deformable annular means is an O-ring mounted within said annular chamber.

* * * * *

UNITED STATES PATENT AND TRADEMARK OFFICE
CERTIFICATE OF CORRECTION

PATENT NO. : 4,214,607
DATED : July 29, 1980
INVENTOR(S) : Daniel Bouteille

It is certified that error appears in the above-identified patent and that said Letters Patent are hereby corrected as shown below:

Front page, [73], "Societe" should be -- Société --;
                "Telemecanique" should be -- Télémecanique --;
Column 1, line 24, after "velocity" insert -- will be regulated by acting on an adjustable flow limiter 9 disposed in --;
Column 4, line 24, "orifice" should be -- orifices --;
Column 5, line 22, "113, 114" should be -- 113 and 114 --;
        line 52, "cramps" should be -- clamps --;
        line 57, "carriers" should be -- carries --;
Column 6, line 52, after "therein" insert --,--;
Column 8, line 23, delete "said means mounted within";
        line 40, after "therein" insert --,--;
        line 50, "perpendicualr" should be -- perpendicular --

Signed and Sealed this

Third Day of March 1981

[SEAL]

Attest:

RENE D. TEGTMEYER

*Attesting Officer*      *Acting Commissioner of Patents and Trademarks*